United States Patent [19]

Theurer et al.

[11] Patent Number: 5,493,499
[45] Date of Patent: Feb. 20, 1996

[54] METHOD FOR DETERMINING THE DEVIATIONS OF THE ACTUAL POSITION OF A TRACK SECTION

[75] Inventors: Josef Theurer, Vienna; Bernhard Lichtberger, Leonding, both of Austria

[73] Assignee: Franz Plasser Bahnbaumaschinin-Industriegesellschaft m.b.H., Vienna, Austria

[21] Appl. No.: 332,637

[22] Filed: Nov. 1, 1994

Related U.S. Application Data

[63] Continuation of Ser. No. 910,627, Jul. 8, 1992, abandoned.

[30] Foreign Application Priority Data

Jul. 12, 1991 [AT] Austria ................... 1401/91

[51] Int. Cl.⁶ .................. G01S 5/10; G01B 5/20
[52] U.S. Cl. .......... 364/449; 364/444; 342/357; 73/146
[58] Field of Search ........ 364/44, 449; 342/357, 342/452; 73/146.4, 146

[56] References Cited

U.S. PATENT DOCUMENTS

| | | | |
|---|---|---|---|
| 4,630,056 | 12/1986 | Noguchi et al. | 342/357 |
| 4,691,565 | 9/1987 | Theurer | 73/146 |
| 4,751,512 | 6/1988 | Longaker | 342/357 |
| 4,792,907 | 12/1988 | Ikeda et al. | 364/449 |
| 4,812,991 | 3/1989 | Hatch | 364/458 |
| 4,837,700 | 6/1989 | Ando et al. | 364/449 |
| 4,894,655 | 1/1990 | Joguet et al. | 340/998 |
| 4,982,332 | 1/1991 | Saito et al. | 364/449 |
| 5,003,306 | 3/1991 | Takahashi et al. | 364/449 |
| 5,016,007 | 5/1991 | Iihoshi et al. | 364/449 |
| 5,030,957 | 7/1991 | Evans | 342/357 |
| 5,077,557 | 12/1991 | Ingensand | 342/52 |
| 5,119,102 | 6/1992 | Barnard | 342/357 |

FOREIGN PATENT DOCUMENTS

| | | |
|---|---|---|
| 0250211 | 12/1987 | European Pat. Off. |
| 2120489 | 11/1983 | United Kingdom. |
| 2249202 | 4/1992 | United Kingdom. |
| 8706410 | 11/1987 | WIPO. |

OTHER PUBLICATIONS

"Canadian & American railways agree on basic characteristics for new system of computer-assisted train controls", PR Newswire, Dec. 1985.
"BN looks to the sky for accurate track charts" May 1990, Railway Tracks & Structures, p. 21.
ETR-Eisenbahn tech. Rundschau (ETR-Railway Review) 39 (1990) No. 4, pp. 202–203.
Railway Track and Structures, May 1990, p. 21.
Navigation am Endpunkt (Termus of Navigation) Yachtrevue, Apr. 1990, pp. 38–41, May 1990, pp. 42–45.

Primary Examiner—Kevin J. Teska
Assistant Examiner—Tyrone V. Walker
Attorney, Agent, or Firm—Meltzer, Lippe, Goldstein et al.

[57] ABSTRACT

In a method for determining the deviations of the actual position of a track (6) with respect to the desired position a first measuring unit (1), movable on the track, and a further second measuring unit (2) are placed at the two end points of a track section to be measured, and their positions as an actual track position are defined relative to track reference points (11). The second measuring unit (2) is moved in stages from a starting point in the direction of the first measuring unit (1) to the end point, wherein at every stop for implementing a measuring procedure, the measurement data of the actual track position are compared with the measurement data of the desired position and a corresponding differential value is calculated and stored. The position of the two measuring units relative to one another are determined in a coordinate system as a result of the reception of a position signal from surveying satellites. With each stop of the second measuring unit (2)—during its measurement movement in the direction of the first measuring unit (1)—the particular relative position change is obtained by the respective reception of a further position signal from surveying satellites.

17 Claims, 3 Drawing Sheets

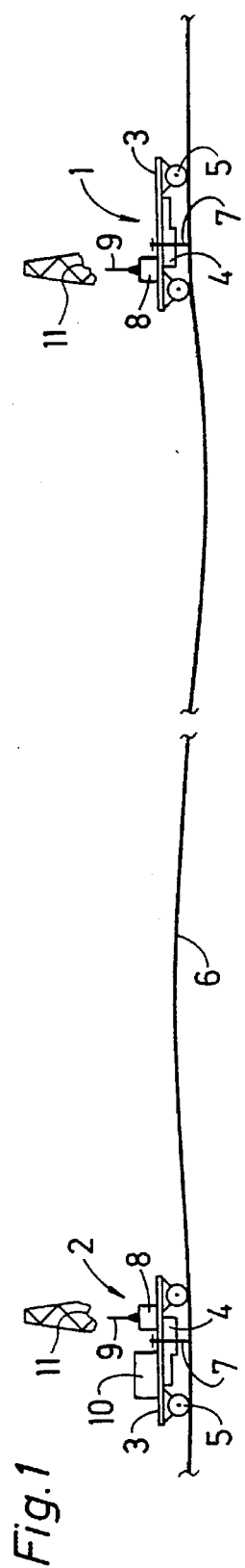
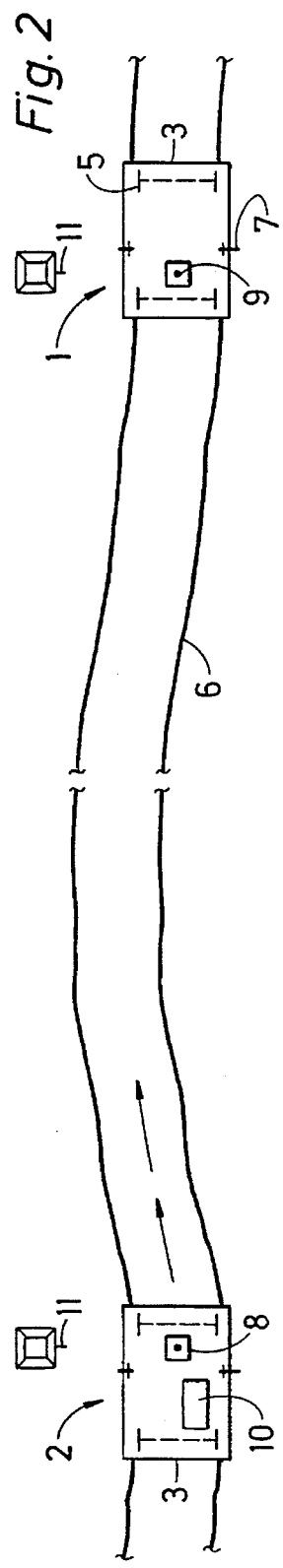
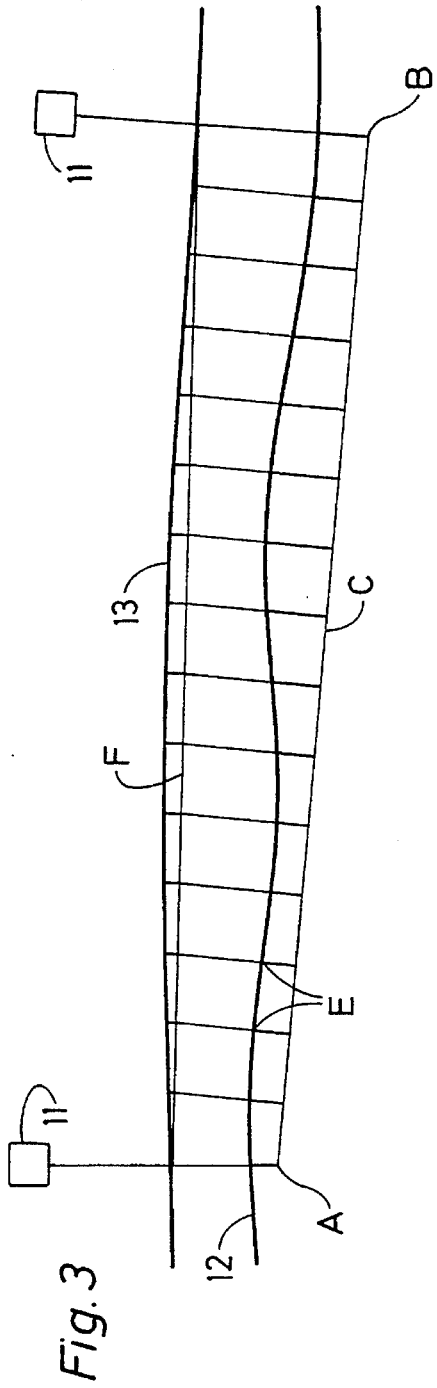

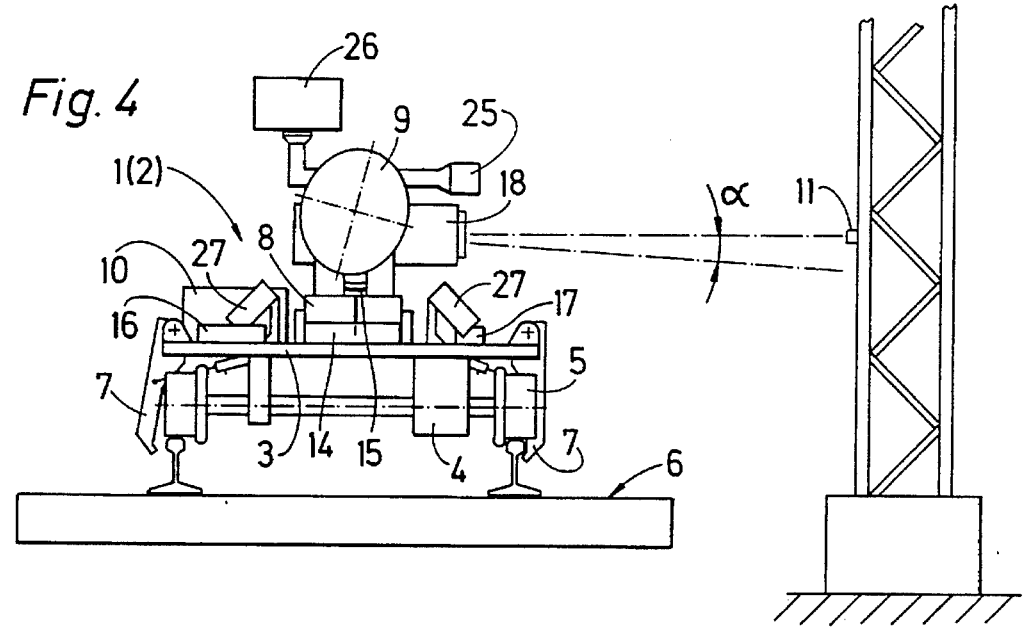

METHOD FOR DETERMINING THE DEVIATIONS OF THE ACTUAL POSITION OF A TRACK SECTION

This is a continuation of application Ser. No. 07/910,627, filed Jul. 8, 1992, now abandoned.

FIELD OF THE INVENTION

The invention relates to a method for determining the deviations of the actual position of a track section with respect to the desired position, in which a first measuring unit, movable on the track, and a further second measuring unit are placed at the two end points of a track section to be measured, and their positions are defined in relation to track reference points, and the second measuring unit is moved in stages from a starting point in the direction of the first measuring unit to the end point, wherein, at every stop for implementing a measuring procedure, the measurement data of the actual track position are compared with the measurement data of the desired position and a corresponding differential value is calculated and stored if appropriate, and relates also to a device for implementing this method.

BACKGROUND OF THE INVENTION

Measuring machines for determining the deviations of the actual position of a track section with respect to the desired position thereof are described in the publication "ETR-Eisenbahntechn. Rundschau" ("ETR-Railway Review") 39 (1990), number 4, pages 202 and 203. A laser beam is used as the reference chord between a measuring unit placed at a reference point and referred to as the satellite vehicle and a further measuring unit moving continuously towards it and referred to as the measuring vehicle. The versines on the laser reference chord are measured, digitalized and stored in a computer. By additionally measuring the lateral distances away from the reference points, the differences from the desired position can be determined and the displacements and lifts to be implemented can be calculated, these being intended to serve as input data for the ALC control computer of tamping machines. Because the reference chord is necessarily produced in the form of a laser beam, the distance between the satellite- and the measuring vehicle is restricted in view of the required scanning of the laser beam by a laser receiver.

Determining the reference points of a track by means of a satellite receiver is already known through the publication "Railway Track and Structures", May 1990 page 21. This GBS (Global Positioning System) satellite receiver processes the position signals from surveying satellites and is located in a two-way vehicle which is moved on the track to the individual reference points to be measured.

It is an object of the present invention to determine displacement between an actual track position and a desired (i.e., ideal) track position.

More precisely, the object of the present invention lies in the creation of a method of the type described in the introduction and of a device for implementing the method, with which, for more economic operation, the two measuring units can be spaced further apart from one another, with a high degree of accuracy of the correction values obtained.

SUMMARY OF THE INVENTION

This object is achieved according to the invention in that a) as a result of the reception of a position signal from surveying satellites, the position of the two measuring units at a starting point and an end point of a track section is determined relative to one another in a coordinate system, and b) the second measuring unit moves along the track towards the first measuring unit, stopping at a plurality of locations, and at each stop of the second measuring unit—as a result of the reception of a further position signal from surveying satellites—the location of the second measuring unit is determined in the coordinate system thereby determining the actual track position at the location. This makes it possible to determine the displacement of the actual track position from the desired track position at the location. Note that at each stop of the second measuring unit, its position is determined by determining its change in position with respect to the first measuring unit.

By combining the steps of the method in this way and employing the latest surveying methods, the measuring process for determining the required track displacement values can be considerably simplified, since with the now possible increased distance apart of the two measuring units from one another, time-consuming fixed point adjustments at the starting or end point can be substantially reduced. A particular advantage also lies in the fact that optical visual communication between the two measuring units is no longer necessary and therefore curved track sections, which also lie on slopes, for instance, can be surveyed without difficulty. Because the position of the two measuring units in relation to one another is determined virtually with one and the same position signal, the relative vertical and directional position of the measuring units has a very high degree of relative accuracy—totally independently of the absolute accuracy of the position signals. As the absolute position of the starting and end points relative to the track reference points located at those points is known, the relative vertical and lateral values determined in the coordinate system incorporating the two measuring units can be converted without difficulty to precise absolute values. Since a reference chord in the form of a laser beam is also now unnecessary, the measuring procedure can also advantageously be implemented to a greater degree independently of adverse weather.

A development of the method according to the invention has the additional advantage that the distances between the measurement points may be selected optionally, irrespective of versine gradation according to the track map.

The invention also relates to a device for implementing the method, in which there is assigned to each measuring unit a satellite receiver designed to receive a position signal from surveying satellites. A device of this kind, while being of a structurally relatively simple design, may be used for virtually fully automatic track measuring, eliminating inaccuracies in the measurement results caused by incorrect or superficial work. The two satellite receivers assigned to respective measuring units enable relative measuring to be carried out with a high degree of measurement accuracy which is independent of the accuracy of an absolute position determination. The inventive device may also advantageously be used without any limitations in an auxiliary function for implementing the hitherto known method if communication with the surveying satellites is impossible in a tunnel, for instance, or as a result of an interfering travel path which prevents communication with the satellite.

Because the receiver is rotatably mounted on the measuring frame of the measuring unit, the antenna connected to the receiver can be adjusted to the particular position which is most favorable for the best and most interference-free reception possible.

The advantage which can be achieved by mounting an antenna of the receiver so that it is able to swivel is that tilting of the antenna relative to the rail, caused by lateral tilt or by incorrect rail geometry for example, can be compensated by appropriate tilting in the opposite direction.

This incorrect position of the antenna can be automatically calculated by lateral tilt measuring devices connected to the measuring unit and be compensated by means of the antenna drive.

Furthermore, immediately after the measuring unit has been placed at the end point of the track section to be measured, the distance from a fixed point can also be accurately determined by means of the laser transmitter. Economically, therefore, the employment of a separate measuring instrument for implementing this fixed point measurement becomes unnecessary.

The inventive device also assists in enabling measurement of the section of track to be implemented by means of a reference chord formed by the laser transmitter in the instance in which radio contact with the surveying satellites is impossible because of a tunnel, a contact line or the like. However, in this instance the distance between the starting and the end point of the section of track to be measured must be shortened.

The method according to the invention can be employed in conjunction with the use of a tamping machine, the track displacement values determined by the measuring units disposed in front being transferable immediately by radio to the tamping machine so that the appropriate correction to the track geometry can be implemented. Because of the longitudinal displaceability of the measuring unit relative to the tamping machine, the latter can be used quite freely for continuous forward working movement, while the measuring unit disposed immediately in front may be brought to a halt at the various locations for implementation of the measuring procedures.

The measuring units of the invention may be remotely controllable. Accordingly, it is possible, in the case of the said combined use with a tamping machine for example, to move and adjust the front measuring unit, in the working direction, from the front driver's cabin of the tamping machine.

BRIEF DESCRIPTION OF THE DRAWINGS

The invention is explained in detail below by means of embodiments represented in the drawing, in which FIG. 1 shows a side view, represented in simplified form, of two measuring units placed at the starting and end points respectively of a section of track to be measured, each comprising a satellite receiver, FIG. 2 shows a plan view of the two measuring units, FIG. 3 shows a schematic representation of the actual and desired path of the track with the versines for determining the necessary track displacements, FIG. 4 shows an enlarged view of a detail of a measuring unit which, as well as a satellite receiver, has a laser transmitter, FIG. 5 shows a plan view of the measuring unit represented in FIG. 4, FIG. 6 shows a partial side view of a tamping machine, the front end of which, in the working direction, is connected to a measuring unit which has a satellite receiver.

DETAILED DESCRIPTION OF THE INVENTION

Figure 7:
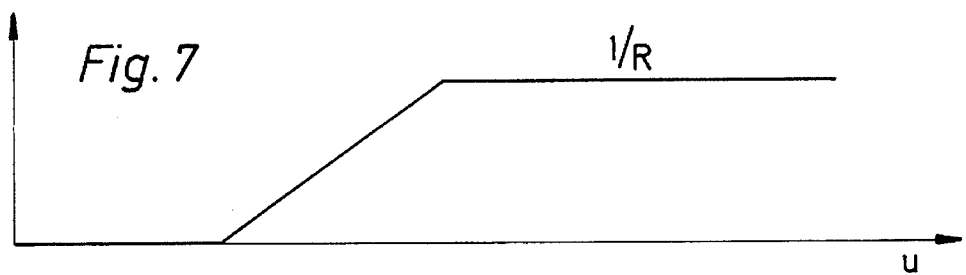
FIG. 7-10 show various diagrams to illustrate the calculating procedure for determining the track correction values.

As may be seen in FIG. 1 and 2, the measuring units 1, 2, equipped in the most simple manner and spaced apart from one another at a distance of about 1000 m, consist in each case of a measuring frame 3 which may be moved on a track 6 by means of a drive 4 and flanged wheels 5. A contact pressure device 7, known per se, is provided for pressing the flanged wheels 5 located on respective longitudinal sides of the measuring frame 3 against the left or right rail of the track 6. Assigned to each measuring unit 1, 2 is a satellite receiver 8 with an antenna 9. The measuring unit 1 has radio equipment for passing on the position data received from the surveying satellites to a computing unit 10 located on the other measuring unit. This computing unit is designed for the input of desired track data and for determining by calculation the curvature of the track 6 from these desired data.

In order to determine the deviations of the actual position of a track section with respect to the desired position thereof, the two measuring units 1, 2 are placed at the end points of a section of track to be measured. These positions, also referred to as the starting point and end point, are located at track reference points 11 which are precisely defined in a track map. When each measuring unit 1, 2 has been pressed against one of the two rails of the track 6, the vertical and lateral position of a zero point located on the measuring unit 1, 2 is determined relative to the track reference point 11. Thus the actual position of the starting and end point of the track section to be measured is absolutely defined in the particular position relative to the desired position as shown on the track map. By means of a position signal received by the two satellite receivers 8, a terrestrial coordinate system is created by which the relative position of the two satellite receivers 8 to one another can be precisely determined. Since the absolute position of the satellite receivers at the starting and end points respectively is also known, each position in this terrestrial coordinate system can thus also be determined in absolute terms.

When the desired data of the track geometry of the section of track located between the starting and end point have been fed into the computing unit 10, the curvature of the said track section—corresponding to the desired position—is calculated and—as described in more detail below—is set by calculation through starting and end points. The measuring unit 2 located at the starting point is then moved relative to the measuring unit 1 located, unchanged in position, at the end point, to a further measuring point. By means of a further position signal, the position of the measuring unit 2 at this measuring point is determined in the said terrestrial coordinate system relative to the second measuring unit 1. By then forming the difference between this position—which defines the actual track geometry—and the desired geometry position determined at the measuring point by calculation from the desired data and converted into the terrestrial coordinate system, the displacement and vertical correction value is calculated and stored in conjunction with a distance value between the measuring point and the starting point.

According to a further possible design variation, these data may, however, also be transmitted by radio direct to a tamping machine in operational use some distance behind. The determined displacement and vertical correction values may be stored in this tamping machine by a computer. As soon as the track lifting and lining unit of the tamping machine is positioned on the measuring point which corresponds to these stored correction values and which is determined by a distance measuring device, the lifting and lining drives are automatically controlled such that the track is lifted into the desired position required.

When measuring of the entire track section is finished, the measuring unit 1 is moved, preferably by remote control, to the next measuring point where the described determining of the position at the starting and end points, which are known with respect to the absolute position, and the subsequent calculation of the differential value between the actual and desired position of the track is repeated. The distance between the individual measuring points expediently corresponds to the spacing of the versines (i.e., deflections) defined on the track map. However, any distances can also be selected.

Instead of calculating the path of the track from the desired data, it is also possible to form an imaginary auxiliary chord by calculation, by means of the position of the track reference points which is known and converted into the terrestrial coordinate system, and to calculate the versines on this chord. The displacement- and vertical correction values are then calculated by comparison of the desired with the actual versines.

FIG. 7 shows the curvature diagram of a track curve, where R indicates the radius of the curve and u the track axis.

Figure 8:
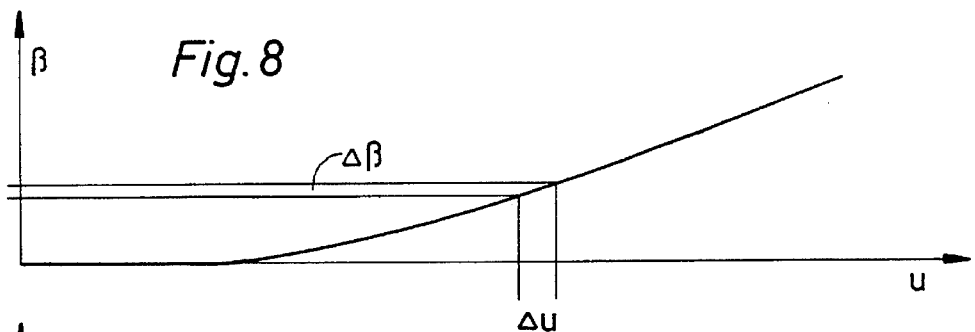

Represented in FIG. 8 is the angle diagram which can be obtained by integration of the curvature diagram, where $\beta$ indicates the gradient.

Figure 9:
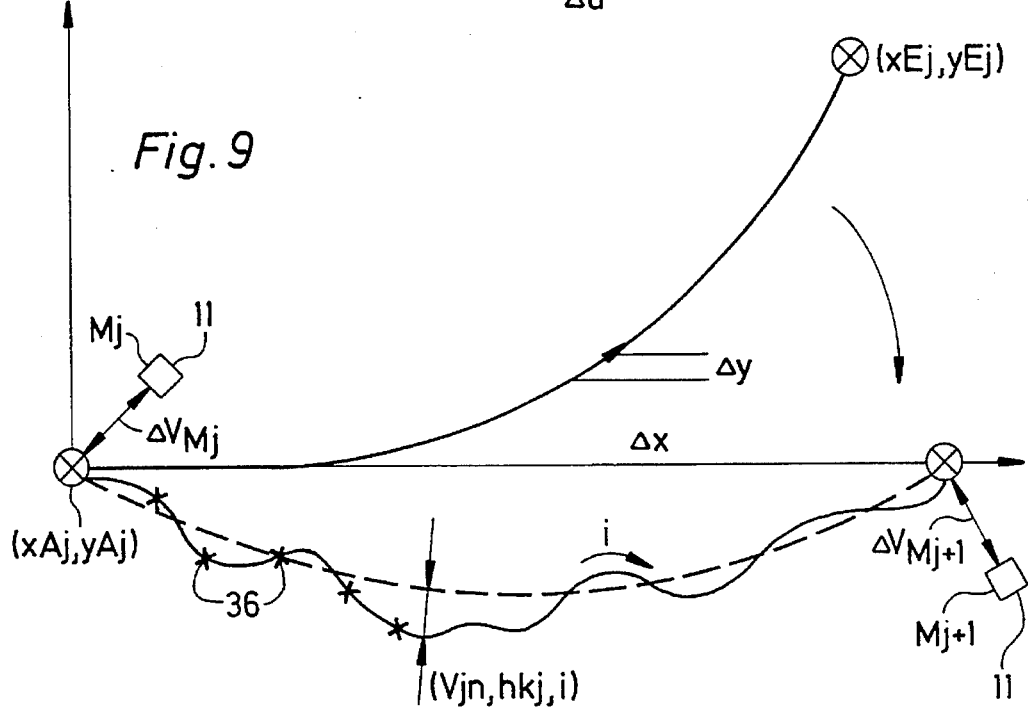

FIG. 9 shows how the desired curve or the track axes are converted into the cartesian coordinate system by transformation of the coordinates. The individual measuring points of the actual track position are represented with the reference numeral 36. The broken line shows the desired position of the track.

Figure 10:
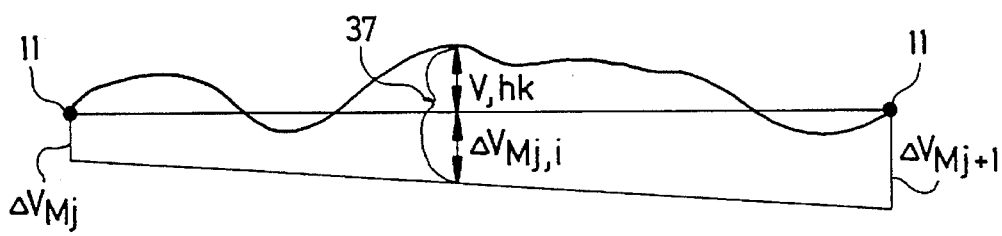

The displacements superimposed on the track points 11 are represented in FIG. 10. The total displacement is indicated by the bracket 37.

Further explanations relating to the calculation of displacements and vertical correction values are set forth below. In the standard railway curve schedules, the course of the desired geometry is represented as a curved line. In a full curve, the curved line has the constant value 1/R (R . . . radius). By integrating the curve diagram, a so-called angle diagram is obtained (see FIG. 8). So-called plotting must be performed if the location diagram in cartesian coordinates is required, (because of the curvilinear track coordinate u), the location diagram being built up in stages in the cartesian coordinate system (x, y). This may be done numerically very easily with the computer with running u. The location diagram obtained in this way may be transformed by coordinate transformation (see FIG. 9) such that the starting and end points are located on the x-axis of the new coordinate system. The same process is carried out with the actual position measured by way of the satellite receivers. It is shown in FIG. 9 and 10 that the displacements or the vertical correction values can be obtained quite simply from the recorded actual values and the calculated desired values. In FIG. 10 it is shown that on to these displacements are further superimposed those displacements required at the reference points 11. The displacements ($\Delta V_{Mj}$) at the track reference points 11 are measured and determined by comparison of the actual distance of the track with the defined desired distance. This may be done manually by means of surveyors' rods or—as already described—with a fixed point measuring device.

The schematic representation which may be seen in FIG. 3 shows an actual position, denoted 12, and a desired position, denoted 13, of a track in a section of track which is located between the two track reference points 11 and which is to be measured. According to the prior art mentioned in the introduction, a laser reference chord C is set up at the starting and end points A and B respectively of the track section to be measured, these being precisely defined with respect to the absolute position by means of the track reference points 11. The particular deviation of the actual position of the track from the laser reference chord C is determined at the individual measuring points E. Since the position of this laser reference chord C is known in relation to the chord F of the track map, the necessary track correction values may be calculated by the determined difference between chord F and the actual position of the track. Unlike this known method, it is now unnecessary in the method according to the invention—as already described—to set up a laser reference chord for assistance purposes, since the position changes at the individual measuring points E may be determined by the satellite receivers.

In FIG. 4 and 5 may be seen a further embodiment of a measuring unit 2, in which identical parts are given the same reference numerals as in FIG. 1 and 2. The satellite receiver 8 is mounted on the measuring frame 3 so as to be rotatable by means of a drive 14 and is connected to the antenna 9, which is itself secured to the receiver 8 so as to be capable of swivelling by means of drives 15. Disposed on the measuring frame 3 are two tilt measuring devices 16, 17, designed respectively to determine the tilt extending perpendicularly to the track axis and in the longitudinal direction of the track. The drives 15 for automatically swivelling the antenna 9 into a vertical position are controlled in dependence on the tilt deviation determined by the two tilt measuring devices 16, 17. As well as the satellite receiver 8, there is also a laser transmitter 18 located on the measuring frame 3. This laser transmitter 18 is designed to be capable of swivelling about a vertical and a horizontal axis 19, 20 mutually independently, and is connected to two angle measuring devices 21, 22 to determine the respective pivoting angles $\alpha$ and $\beta$. Remotely controllable drives 23, 24 are provided for swivelling the laser transmitter 18 about the said axes 19, 20. A telescopic sight 25 connected to the laser transmitter 18 is linked in its ocular range with a video camera 26. Two further video cameras 27 are connected to the measuring frame 3 for video-scanning a track reference point 28 located on a rail base.

In order to measure a track section, the two measuring units 1, 2 (of which only the front one, in the working direction, has a laser transmitter 18) are moved to the starting point. The front measuring unit 1 is moved until there is agreement, established by the relevant video camera 27, between a marking located on the measuring frame 3 and a track reference point marking. With action upon an associated drive, the appropriate contact pressure device 7 is pressed against the exterior side of the rail to eliminate the gauge clearance. Next, the track reference point 11 is sighted by means of video camera 26 and the telescopic sight 25 and—taking into account the deviations, determined by the two angle measuring devices 21, 22, of the laser transmitter 18 from the desired position—the actual position is measured with reference to the said track reference point 11 and supplied to the computing unit 10. The front measuring unit 1 is then moved to the end point of the section of track to be measured, where the actual position with respect to the corresponding track reference point is similarly determined in the manner described. In the meantime, the second, rear measuring unit 2 is moved to the starting point which has been previously defined in its actual position, and is pressed by the contact pressure device 7 against the corresponding reference rail. When a position signal is received from surveying satellites by the two satellite receivers 8, the measuring process already described in relation to FIGS. 1 and 2 begins.

To ensure that the GPS (Global Positioning System) antenna 9 has the best and most interference-free reception possible, it must be aligned with the satellites by means of the drive 14. In parallel with determining the appropriate coordinates at the measuring point, it would also be possible to determine the necessary amount of adjustment of the antenna 9. The antenna 9 would thereby be aligned automatically. Along with the necessary conversion of the GPS-coordinate system into the one which is standard with railways (in the case of absolute measurement), the systematic errors which occur because of the possible tilting of the antenna relative to the rail must also be compensated. These errors arise when the measuring unit 1, 2 is located at a cant and in a longitudinal incline. Both values are detected by the two tilt measuring devices 16, 17 (e.g. electrical precision pendulums or inclinometer) and the incorrect position of the antenna 9 is thereby calculated. A corresponding incorrect position can be compensated by means of the drives 15. Another possibility would be readjustment of the receiving axis perpendicularly to the contact surface. For this reason the antenna 9 should be installed in every case as close to the top edge of the rail as possible.

Because the GPS-systems required at the moment have limitations (such as the optical visual communication with the surveying satellites, interference by catenary and the like), it is advisable that the measuring units should be designed for setting up a laser reference chord for assistance purposes as described by the prior art. To this end, the aforementioned laser transmitter 18, firstly, and a laser receiver disposed on the other measuring unit may be employed.

As may be seen in FIG. 6, the measuring unit 1 described in FIGS. 4 and 5 is connected to the front end, in the working direction, of a tamping machine 29. Instead of a drive 4 for longitudinally displacing the measuring unit 1, the latter is connected to the tamping machine 29 so as to be longitudinally displaceable by means of a drive 30. The said tamping machine is equipped in the known manner with a levelling and alignment reference system 31 specific to the machine, tamping tools 32, a measuring axis 33 disposed immediately in front of the said tamping tools and a track lifting and lining unit.

As already described with reference to FIGS. 1 and 2 or 4 and 5, the procedure is performed with this measuring unit, integral with a tamping machine 29, to determine the necessary track correction values, the second measuring unit 2 being halted at the end point of the section of track to be measured—about 1000 m in front of the tamping machine in the working direction. The first measuring unit 1 is moved by means of the drive 30 into the front end position, represented with dot and dash lines, and is briefly halted by pressure of the contact pressure device 7 against the appropriate reference rail, while independently thereof (the drive 30 is in the floating position) the tamping operation is performed by the tamping machine 29. While the position of the measuring unit 1 remains locally unchanged, the relative actual position is determined in the manner described by means of a position signal. As soon as this position determination is completed, there is an appropriate movement forward to the next measuring point again, effected by means of the drive 30. From the calculated deviations of the actual from the desired position, chords 34 of the levelling and alignment reference system 31 of the tamping machine 29 can be run directly on the desired position of the track. The data of the satellite receivers located on the two measuring units 1, 2 may be transmitted by radio to a computer of the tamping machine 29.

A further variant of this solution represented in FIG. 6 could consist in installing a number of stationary calibrated satellite receivers which are sufficiently accurate in absolute terms, instead of the hitherto standard track reference points. In relation to these stationary satellite receivers, the relative position measured by means of the satellite receiver located on the measuring unit 1 which is linked to the tamping machine can be converted in practice into absolute coordinates. In this case the measurement is implemented point by point. Since the desired position of these points is also specified in absolute coordinates, the displacement- and vertical correction values may be given directly.

A satellite receiver secured directly to the measuring axis 33 is indicated by the reference numeral 35. While the tamping machine 29 is in operational use, this satellite receiver continuously determines the absolute position of the track section located in the region of the measuring axis 33 with respect to direction and height. The lifting and lining unit disposed immediately in front of the tamping tools 32 would be controlled directly by means of the measured deviation between the absolute desired and actual position. If continuous determination of the absolute actual position is impossible for reasons of speed, it could be obtained at the beginning of the operation and the displacement- and lifting correction values calculated and stored. These are then transferred to the track. Because of the absolute measurement and the potential considerable deviations of the actual position (e.g. of the height over great distances), the lifting and displacement values should in each case be checked that they can be implemented in practice. The procedure to be followed if preset threshold values are exceeded can in each case be determined in advance.

Finally, the above-described embodiments of the invention are intended to be illustrative only. Numerous alternative embodiments may be devised by those skilled in the art without departing from the spirit and scope of the following claims.

We claim:

1. A method for determining deviations of an actual position of a track section with respect to a desired position thereof, comprising the steps of:

provifing a first measuring unit, which is positioned at an end point of said track section to be measured, and a second measuring unit which is movable toward said first measuring unit, from a starting point of said track section to be measured, defining positions of said end point and said starting point with respect to reference points in a track map, defining initial positions of said first and second measuring units as actual track positions with respect to track reference points, receiving a position signal at said first and second measuring units from surveying satellites, establishing a coordinate system between said first and second measuring units as a result of receiving said position signal from said surveying satellites, determining the position of said second measuring unit relative to said first measuring unit in said coordinate system, so that any position of said second measuring unit in said coordinate system can be determined, moving said second measuring unit in stages from said starting point in the direction of said first measuring unit positioned at said end point, at each stop of said second measuring unit, during measurement movement towards said first measuring unit, obtaining a position change in said coordinate system of said second measuring unit relative to said first measuring unit, as a result of the reception of a further position signal from said surveying satellites, determining the position of said second measuring unit at each said stop, to determine said actual position of said track section in said coordinate system at each said stop location of said second measuring unit, using a computing unit to compare measurement data of said actual position of said track section with measurement data of said desired position of said track section at each one of said stop locations of said second measuring unit, calculating a corresponding differential value from each of said comparisons, and storing, if appropriate, said corresponding differential values.

2. The method of claim 1 further comprising the steps of determining through use of said computing unit from desired position data of said track section, the curvature of said track section to be measured in its desired position in a vertical and horizontal plane.

3. The method of claims 2, wherein said measured curvature is aligned with said first and second end points of the track section, wherein said end points are defined relative to the desired position.

4. A system for determining deviations of an actual position of a track section with respect to a desired position thereof, comprising:

first and second measuring units, said first measuring unit being positioned at an end point of said track section, and said second measuring unit being positioned initially at a starting point of said track section, each of said measuring units comprising a measuring frame supported on said track section on flanged wheels and a motive drive for longitudinally moving said measuring units along said track section, said motive drive of said second measuring unit moving said second measuring unit towards said first measuring unit with a plurality of stops, means for defining said initial positions of said measuring units as actual track positions relative to track reference points, each of said first and second measuring units also comprising a satellite receiver for receiving a position signal from surveying satellites for determining the position of said measuring units relative to one another in a coordinate system, and for receiving a subsequent position signal from said surveying satellites when said second measuring unit is at each stop during movement towards said first measuring unit to determine the respective relative position change in said coordinate system of said second measuring unit with respect to said first measuring unit at each stop, thereby determining the actual position of said track section at each one of said stops of said second measuring unit in said coordinate system, and a computing unit in one of said measuring units for comparing said actual track position to said desired track position to determine a deviation at each one of said stops.

5. The system of claim 4 wherein said computing unit determines a desired path of track curve.

6. The system of claim 5, wherein said desired path of track curve is aligned with said first and second end points, which end points are defined with reference to the desired position.

7. The system of claim 4 wherein the satellite receiver is mounted on the measuring frame of each measuring unit so that it is rotatable by rotation drive means.

8. The system of claim 4 wherein each satellite receiver includes an antenna mounted on the measuring unit for swivel movement by means of swivel drive means.

9. The system of claim 8 wherein each measuring unit includes tilt measuring means which detects lateral tilt perpendicular to a track axis and longitudinal inclination in the longitudinal direction of the track.

10. The system of claim 9 wherein in each measuring unit the tilt measuring means controls the swivel drive means to swivel the antenna into a position in response to a tilt deviation.

11. The system of claim 4 wherein at least one of said measuring units includes a laser transmitter.

12. The system of claim 11 wherein said laser transmitter is swivellable about vertical and horizontal axes and is connected to angle measuring means for determining the angles about said axes to which said laser transmitter is swivelled.

13. The system of claim 4 wherein said first measuring unit is disposed in front of a tamping machine and connected thereto.

14. The system of claim 13 wherein the motive drive for the first measuring unit intermittently moves the first measuring unit longitudinally along the track in relation to the tamping machine.

15. The system of claim 4 wherein said motive drives are remotely controllable.

16. The system of claim 11 wherein said laser transmitter is remotely controllable.

17. The system of claim 16 further including video camera means for determining the position of said one measuring units with respect to one of more track reference points.

* * * * *